(12) United States Patent
Wavering et al.

(10) Patent No.: US 7,922,117 B2
(45) Date of Patent: Apr. 12, 2011

(54) PRIMARY PANEL AND MOTOR CONTROLLER INTEGRATION FOR AIRCRAFT POWER DISTRIBUTION SYSTEM

(75) Inventors: Jeffrey T. Wavering, Rockford, IL (US); Eric A. Carter, Monroe, WI (US); Josef Maier, Munningen (DE)

(73) Assignee: Hamilton Sundstrand Corporation, Rockford, IL (US)

( * ) Notice: Subject to any disclaimer, the term of this patent is extended or adjusted under 35 U.S.C. 154(b) by 1448 days.

(21) Appl. No.: 10/929,318

(22) Filed: Aug. 30, 2004

(65) Prior Publication Data

US 2006/0044722 A1  Mar. 2, 2006

(51) Int. Cl.
B64D 41/00 (2006.01)

(52) U.S. Cl. .......................................... 244/58

(58) Field of Classification Search .................. 244/1 R, 244/57, 58, 118.1, 118.5
See application file for complete search history.

(56) References Cited

U.S. PATENT DOCUMENTS

| | | | |
|---|---|---|---|
| 4,089,040 A | 5/1978 | Paulsen | |
| 4,153,225 A | 5/1979 | Paulsen | |
| 4,689,733 A * | 8/1987 | Guth et al. | 363/51 |
| 5,201,798 A | 4/1993 | Hogan | |
| 5,499,187 A * | 3/1996 | Smith | 363/142 |
| 5,612,579 A | 3/1997 | Wisbey et al. | |
| 5,675,194 A * | 10/1997 | Domigan | 307/147 |
| 6,410,995 B1 | 6/2002 | Grouse et al. | |
| 6,450,822 B1 | 9/2002 | Eller | |
| 6,664,656 B2 | 12/2003 | Bernier | |
| 6,695,520 B1 | 2/2004 | Sarno et al. | |
| 2004/0129835 A1* | 7/2004 | Atkey et al. | 244/118.5 |

OTHER PUBLICATIONS

"Leach Toolkit" from www.leachintl3.com Jul. 18, 2006.*

* cited by examiner

*Primary Examiner* — Tien Dinh
(74) *Attorney, Agent, or Firm* — Carlson, Gaskey & Olds PC

(57) ABSTRACT

An electric power generation and distribution system includes a primary distribution panel, which preferably operates at 230 VAC, and a High Voltage Direct Current (HVDC) panel in direct electrical communication therewith. The HVDC panels power motor controllers which drive electric motors residing in the center or aft sections of the aircraft. As many of the large electrical loads are located in the aft section of the aircraft, an aft electronics bay is located adjacent the aircraft wing roots to house the primary distribution panels and the HVDC panels.

19 Claims, 3 Drawing Sheets

PRIMARY PANEL AND MOTOR CONTROLLER INTEGRATION FOR AIRCRAFT POWER DISTRIBUTION SYSTEM

BACKGROUND OF THE INVENTION

The present invention relates to an aircraft power distribution system, and more particularly to an aircraft power distribution system that combines an alternating current power panel and a high voltage direct current motor controller panel which minimizes power loss from feeder resistance while maximizing weight savings.

Conventional gas turbine powered aircraft provide a variety of power to the aircraft in addition to the thrust required for propulsion. The three main power draws from the engine are electrical, bleed air, and pneumatic/hydraulic. In addition to the engine driven generators that provide electrical power to the aircraft, bleed air is drawn off the engine and used for the aircraft pressurization, cooling and heating systems. The pneumatic/hydraulic systems are pressurized with pumps which are driven by an engine driven gearbox. Each of these conventional power distributions systems reduces the engine efficiency and the resulting thrust for aircraft propulsion.

Conventional electric power generation and distribution systems for commercial aircraft typically include a generator located on and driven by each of the aircraft's engines which have a rating anywhere from 80 kVA to 300 kVA. The power produced by the engine mounted generators is routed into the aircraft to what is commonly referred to as primary distribution panels. This power is traditionally 3 Phase, 115 VAC, 400 hz.

Conventional power distribution systems route the electric power to a single electronics bay in the front of the aircraft that is generally below the cockpit. The primary distribution panels are segregated on the right and left side of the aircraft and the power from the primary panels is routed to secondary distribution panels usually, located in the cockpit. The secondary distribution panels transfer power to the required loads such as to power electric motors, lights and other aircraft systems. In between the primary and secondary panels, the power may be converted to DC to provide for many of the direct current loads required in the cockpit such as avionic systems.

Such conventional power distribution systems are effective for current generation aircraft as such aircraft utilize the extensive bleed air, pneumatic, and hydraulic power distribution systems which minimizes electrical power distribution system requirements.

Recently, aircraft systems are tending toward a greater usage of electrically powered equipment which eliminate the bleed air system and minimizes the pneumatic and hydraulic systems. These "more electric" aircraft power distribution systems operate at significantly increased power levels on the order of 1,000 kVA. Conditioning systems such as cabin pressure, cooling and heating are powered by electric motors. The hydraulic pumps are also driven by electric motors. In addition, without a bleed air system to spin-up the engine during start, the generator operates as a motor during the start sequence to spin up the turbine.

All these relatively large electric motors, used to power pumps and compressors, require motor controllers that provide the appropriate current and voltage per torque requirements. This is achieved by providing DC power to motor controllers that invert the power to AC and drive the electric motors. Furthermore, because the power requirements are relatively large, the voltage of the "more electric" aircraft power system has all been increased to reduce operating current. Current requirements drive wire size, weight and route flexibility throughout the aircraft.

A difficulty of the "more electric" aircraft power system resides in the amount of power being moved. To transfer the relatively greater power requires larger cable or may require multiple cables that share the current to permit proper routing throughout the aircraft structure. Each time a cable leaves a panel on an aircraft and is routed to a different panel, the cable is protected against failure modes, which requires further protective systems such as current transformers that sense a short and command a controller to open a relay. Protective systems increase aircraft weight and are necessary, but directly affect performance in terms of range, fuel burn and operation cost.

Accordingly, it is desirable to provide an aircraft power distribution system which produces significant weight and power loss reduction while handling increased electrical loads expected of "more electric" aircraft power systems.

SUMMARY OF THE INVENTION

The electric power generation and distribution system according to the present invention includes a primary distribution panel, which preferably operates at 230 VAC, and a High Voltage Direct Current (HVDC) panel in direct electrical communication therewith. The HVDC panel, which preferably operates at +/−230 VDC, to distribute power to electric motor controllers which in turn drive motors for the hydraulic pumps and air compressor systems residing in the center or aft sections of the aircraft which were conventionally powered by engine hydraulics and bleed air. As many of the large electric driven loads may be located in the aft section of the aircraft, an aft electronics bay may be located to house both the primary distribution panels along with the HVDC panels. Secondary power panels may remain in a front electronics bay under an aircraft cockpit.

The primary distribution panel and the HVDC panel may be located back to back within the aft electronics bay to provide for efficient aircraft installation and minimal panel structure for the provided function, achieving an overall lighter combined assembly. Space and weight efficiency is further maximized in the aft electronics bay, as no wire routing volume or protection is required between the panels. This multitude of advantages makes this concept preferred for optimizing aircraft performance.

The present invention therefore provides an aircraft power distribution system which produces significant weight and power loss reduction while handling increased electrical loads expected of "more electric" aircraft power systems.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
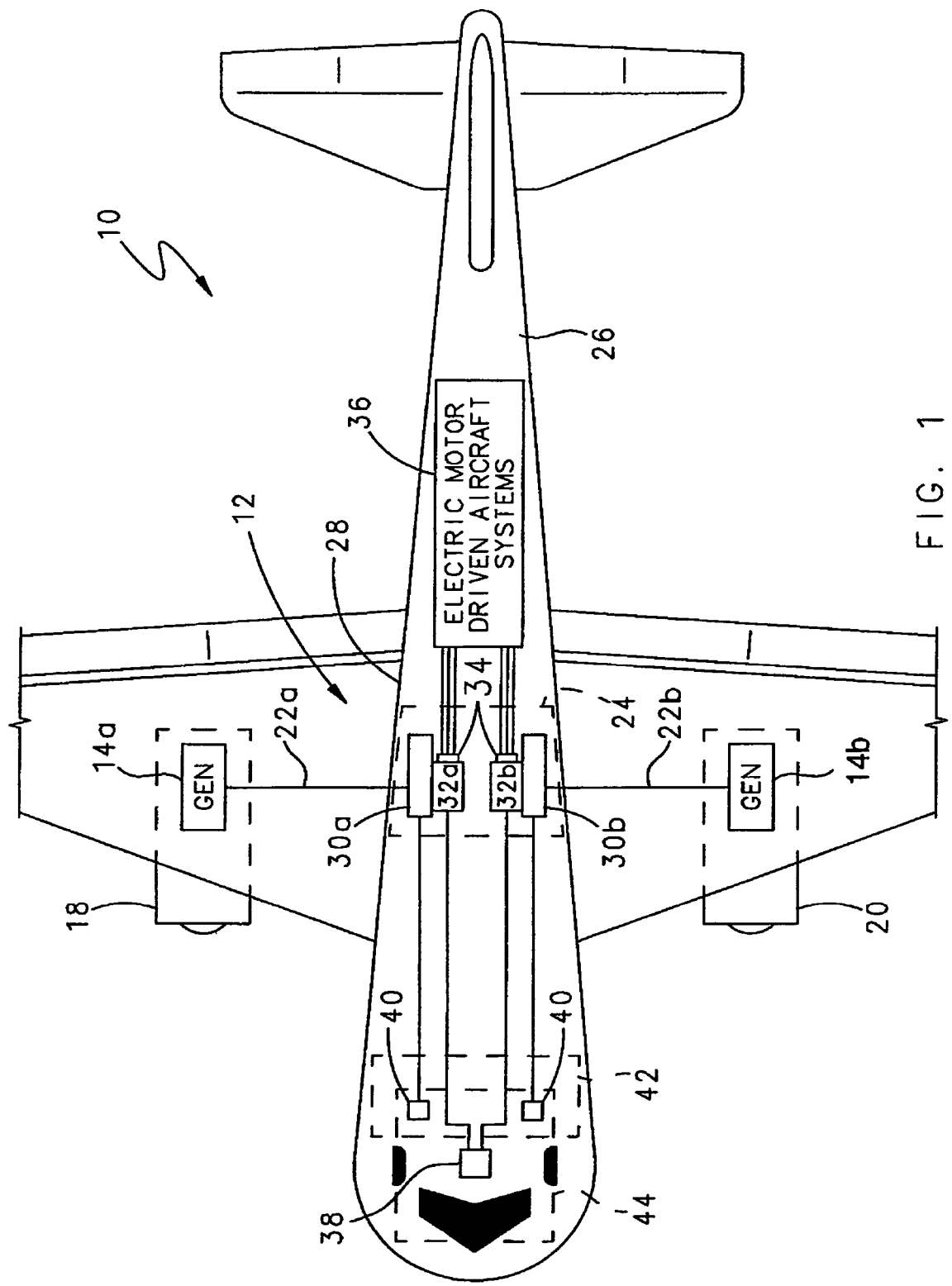
FIG. 1 is a general schematic view an exemplary aircraft embodiment for use with the present invention.

FIG. 1 illustrates a general schematic plan view of a twin-engine aircraft 10 with an electric power generation and distribution system 12 which is powered by a generator 14*a*, 14*b* coupled to and driven from each of the aircraft engines 18, 20. The output of each generator 14*a*, 14*b* is coupled by main power feeders 22*a*, 22*b* to an electronics bay 24 which is preferably located within the fuselage 26 near a wing root 28. It should be understood that the present invention is equally advantageous for use with aircraft with any number of engines.

The electric power generation and distribution system 12 preferably includes a primary distribution panel (P100, P200) 30*a*, 30*b* which each receives power from one generator 14*a*, 14*b* over a respective main power feeder 22*a*, 22*b*. That is, the generator 14*a*, 14*b* coupled to the aircraft engine 18, communicates with the primary distribution panel (P100) 30*a* on one side of the aircraft and the generator 14*b* coupled to the aircraft engine 20 communicates with the primary distribution panel (P200) 30*b* on the opposite side of the aircraft. It should be understood that other panel arrangements for other multi-engine vehicles would also benefit from the present invention.

Each primary distribution panel (P100, P200) 30*a*, 30*b* preferably operates at 230 VAC and communicates power to an associated High Voltage Direct Current (HVDC) panel (P700, P800) 32*a*, 32*b* mounted thereto and in direct electrical communication therewith. The HVDC panels 32*a*, 32*b* include motor controls 34 which drive electric motors 36 that may reside in the center or aft sections of the aircraft or any other convenient location on the aircraft. The electric motors 36 drive aircraft systems which are conventionally driven by bleed air or hydraulic systems. The motor controls 34 communicate controlled electrical power to individual electric motors 36 in response to a control 38 (illustrated schematically.) The control 38 need only communicate the desired electric motor 36 operational speed to the motor controls 34 on HVDC panels 32*a*, 32*b* to drive the associated electric motor driven aircraft system. It should by understood that additional load protection and control devices, such as thermal circuit breakers may also be provided to increase overall system reliability and protection.

These relatively large electric motors 36 require motor controllers 34 that provide the appropriate current and voltage per torque requirements. This is achieved by communicating DC to the motor controllers on the HVDC panels 32*a*, 32*b* which invert the power to AC and drive the electric motors 36. Furthermore, because the power requirements are relatively large, the voltage of the generation system is preferably 230 VAC to reduce current requirements, which drive wire size, weight and ability to provide routes through the aircraft.

As many of the large loads may be located in the aft of the aircraft 10 and it may not be desirable to route power to the front of the aircraft 10, the aft electronics bay 24 may be located to house the primary distribution panels 30*a*, 30*b* and HVDC panels 32*a*, 32*b*. The secondary power panels (P300, P400) 40 may remain in a front electronics bay 42 under an aircraft cockpit 44. That is, the front electronics bay 42 may be a conventional bay location typically utilized in current aircraft layouts while the aft electronics bay 24 may be a heretofore unutilized location for electrical power conversion and distribution as conventional aft aircraft systems are conventionally driven by bleed air or hydraulics. That is, in conventional aircraft layouts there is minimal requirement for electrical power distribution to the central and aft aircraft sections.

Figure 2:
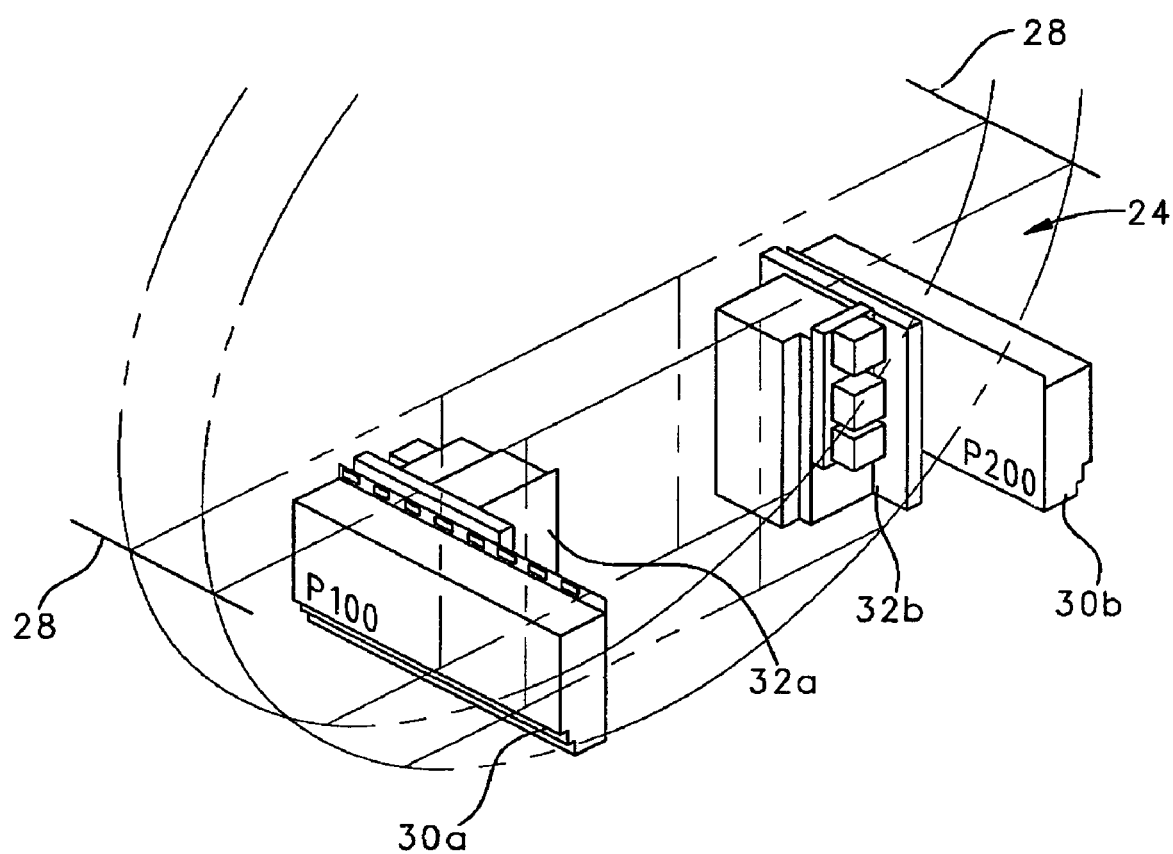
FIG. 2 is a perspective view of a an electronics bay of the electric power generation and distribution system of the present invention.

Referring to FIG. 2, the panels 30, 32 are located back to back and adjacent each wing root 28 within the aft electronics bay 24 for redundant power distribution therefrom. Furthermore, the integrated panels 30, 32 provide for efficient aircraft installation and minimal panel structural for the provided function achieving an overall lighter combined assembly. Space and weight efficiency is maximized in the aft electronics bay 24, as no wire routing volume or protection is required between panels.

Figure 3:
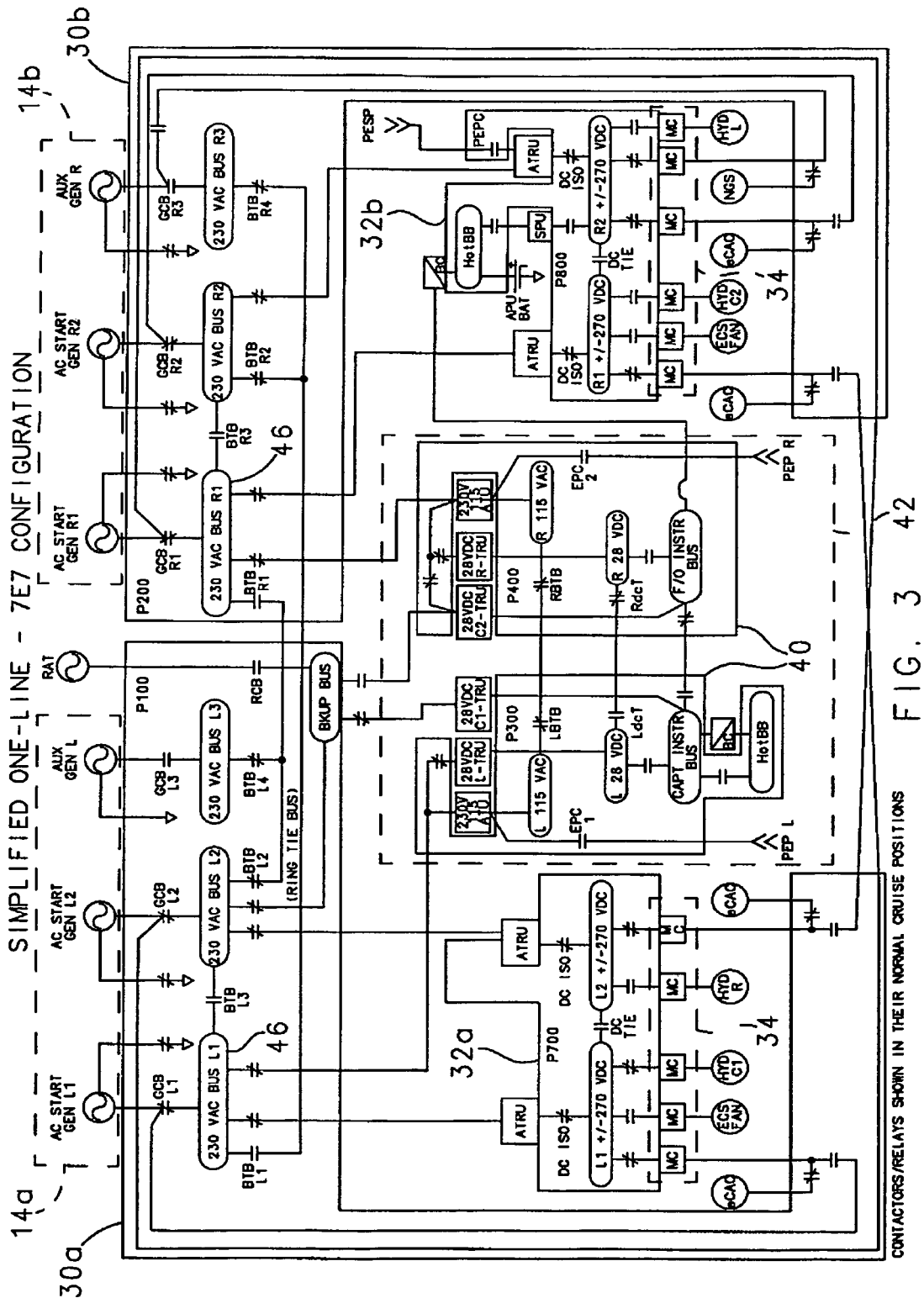
FIG. 3 is a schematic diagram of the electric power generation and distribution system of the present invention.

Referring to FIG. 3, by orienting the primary distribution panel (P100 and P200) 30*a*, 30*b* to be directly adjacent and directly connected to the high voltage distribution panel (P700 and P800) 32*a*, 32*b*, a systematic solution is achieved which solves many of the inefficiencies of traditional panel approaches. The panels are isolated electrically and physically for protection and segregation, e.g., a fault in the HVDC panel 32*a*, 32*b* will not propagate to damage the primary distribution panels 30*a*, 30*b*.

The relatively large amount of power respectively communicated from the primary distribution panels 30*a*, 30*b* into the HVDC panel 32*a*, 32*b* is directly distributed through a "fault free" zone. A "fault free" zone assumes that normal fault modes like wire shorts due to breakage, abrasion, and insulation wear and deterioration do not exist. This disclosed "fault free" zone preferably includes a busbar interconnect 46 instead of wires. That is, the panels 30*a*, 32*a* and 30*b*, 32*b* provide a direct busbar-to-busbar electrical communication link. The busbars 46 are generally more reliable than wire and have a relatively low failure probability. The busbar 46 between the panels 30*a*, 32*a* and 30*b*, 32*b* require no current sense, and overall will be relatively shorter, lighter, and more thermally efficient than a wire interface which increases system efficiency. Furthermore, a relatively long interconnect of a wire to a separated panel is not as thermally efficient as a short busbar.

It should be understood that relative positional terms such as "forward," "aft," "upper," "lower," "above," "below," and the like refer to a preferred embodiment of the present invention and are with reference to the normal operational attitude of the vehicle and should not be considered otherwise limiting. It should be understood that one skilled in the art could devise other aircraft architectures that incorporate the claimed invention.

The foregoing description is exemplary rather than defined by the limitations within. Many modifications and variations of the present invention are possible in light of the above teachings. The preferred embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. An aircraft electric power generation and distribution system comprising:
   a primary distribution panel; and
   a High Voltage Direct Current (HVDC) panel mounted to and in electrical communication with said primary distribution panel.

2. The system as recited in claim 1, wherein said primary distribution panel operates at 230 VAC.

3. The system as recited in claim 2, wherein said primary distribution panel communicates with an engine driven generator.

4. The system as recited in claim 1, wherein said HVDC panel includes a multiple of motor controllers.

5. The system as recited in claim 4, further comprising an electric motor in electrical communication with each of said multiple of motor controllers.

6. The system as recited in claim 1, further comprising a secondary power panel in electrical communication with said primary distribution panel over a wire interconnect, said secondary panel located remotely from said primary distribution panel.

7. The system as recited in claim 6, wherein said secondary panel is located forward of said primary distribution panel.

8. The system as recited in claim 7, wherein said secondary panel is located adjacent an aircraft cockpit.

9. The system as recited in claim 1, wherein said primary distribution panel is in electrical communication with said HVDC panel through a busbar interconnect.

10. The system as recited in claim 1, wherein said primary distribution panel is in electrical communication with said HVDC panel through a fault free zone.

11. An aircraft electric power generation and distribution system comprising:
   a generator driven by an engine
   an aft electronics bay;
   a primary distribution panel located within said aft electronics bay, said primary distribution panel in electrical communication with said generator and operated at 230 VAC;
   a High Voltage Direct Current (HVDC) panel mounted to and in electrical communication with said primary distribution panel through a busbar interconnect;
   a forward electronics bay; and
   a secondary panel located within said forward electronics bay, said secondary panel in electrical communication with said primary distribution panel.

12. The system as recited in claim 11, wherein said forward electronics bay is located adjacent an aircraft cockpit.

13. The system as recited in claim 11, wherein said aft electronics bay is located adjacent an aircraft wing root.

14. The system as recited in claim 11, wherein said HVDC panel includes a multiple of motor controllers.

15. The system as recited in claim 14, further comprising an electric motor in electrical communication with each of said multiple of motor controllers.

16. The system as recited in claim 1, further comprising a second primary distribution panel including a second HVDC panel mounted to said second primary distribution panel.

17. The system as recited in claim 16, wherein said primary distribution panel and said second primary distribution panel are mounted adjacent respective opposite wing roots of the aircraft.

18. The system as recited in claim 11, comprising a second primary distribution panel having a second HVDC panel mounted to said second primary distribution panel, wherein said primary distribution panel and said second primary distribution panel are mounted within said aft electronics bay adjacent respective opposite wing roots of the aircraft.

19. The system as recited in claim 11, wherein said primary distribution panel is in electrical communication with said HVDC panel through a fault free zone.

* * * * *